(12) United States Patent
Sen et al.

(10) Patent No.: US 8,526,533 B2
(45) Date of Patent: Sep. 3, 2013

(54) SYSTEMS AND METHODS FOR MEASURING I-Q MISMATCH

(75) Inventors: Shreyas Sen, Atlanta, GA (US); Shyam Kumar Devarakond, Atlanta, GA (US); Abhijit Chatterjee, Marietta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 135 days.

(21) Appl. No.: 13/114,178

(22) Filed: May 24, 2011

(65) Prior Publication Data

US 2012/0140807 A1 Jun. 7, 2012

Related U.S. Application Data

(60) Provisional application No. 61/347,621, filed on May 24, 2010.

(51) Int. Cl.
*H04L 25/03* (2006.01)

(52) U.S. Cl.
USPC ..... 375/296; 375/297; 455/114.3; 455/115.3; 455/127.2

(58) Field of Classification Search
USPC .............. 375/261, 285, 295–298, 324, 340, 375/345, 346, 349; 455/67.16, 69, 114.2, 455/114.3, 115.1, 115.3, 127.1, 127.5, 226.1–226.3, 455/296, 303–305; 332/107, 318, 320, 321, 332/323, 349, 351, 353, 358
See application file for complete search history.

(56) References Cited

U.S. PATENT DOCUMENTS

| | | | |
|---|---|---|---|
| 7,706,475 B1 * | 4/2010 | Kopikare et al. | 375/324 |
| 8,184,740 B2 * | 5/2012 | Matsuno et al. | 375/302 |
| 2004/0203472 A1 * | 10/2004 | Chien | 455/68 |
| 2010/0054367 A1 * | 3/2010 | Gorday | 375/324 |

* cited by examiner

*Primary Examiner* — Dac Ha
(74) *Attorney, Agent, or Firm* — Dustin B. Weeks, Esq.; Ryan A. Schneider, Esq.; Troutman Sanders LLP

(57) ABSTRACT

An exemplary embodiment of the present invention provides a method of measuring I-Q mismatch in a system having a transmitter. The transmitter comprises an in-phase up-converter, a quadrature-phase up-converter, and a power detector. The method of measuring I-Q mismatch comprises measuring an in-phase transmit power at the power detector caused by transmitting an in-phase output signal to the in-phase up-converter, measuring a quadrature-phase transmit power at the power detector caused by transmitting a quadrature-phase output signal to the quadrature-phase up-converter, calculating a transmitter-gain-mismatch as a function of the in-phase transmit power and the quadrature-phase transmit power, measuring an I-Q transmit power at the power detector caused by simultaneously transmitting a gain-mismatch-compensated in-phase output signal to the in-phase up-converter and a gain-mismatch-compensated quadrature-phase output signal to the quadrature-phase up-converter, and calculating a transmitter-phase-mismatch as a function of the I-Q transmit power.

14 Claims, 9 Drawing Sheets

SYSTEMS AND METHODS FOR MEASURING I-Q MISMATCH

CROSS-REFERENCE TO RELATED APPLICATIONS

This application claims the benefit of U.S. Provisional Application Ser. No. 61/347,621, filed 24 May 2010, which is incorporated herein by reference in its entirety as if fully set forth below.

FEDERALLY SPONSORED RESEARCH STATEMENT

The inventions described in this patent application were made with Government support under Agreement No. HR0011-10-3-0002, awarded by DARPA, and Agreement No. CCF-0916270, awarded by the National Science Foundation. The Government has certain rights in the invention described in this patent application.

TECHNICAL FIELD OF THE INVENTION

The various embodiments of the present disclosure relate generally to systems and methods for measuring I-Q mismatch in transmitters and receivers.

BACKGROUND OF THE INVENTION

Many communication systems used today employ I-Q modulation and demodulation schemes to transmit and receive information at increased rates. In these schemes, the output of a transmitter, as well as the input of a receiver, includes both an in-phase and quadrature-phase signal. Ideally, the quadrature-phase signal is 90 degrees out of phase with the in-phase signal. Unfortunately, modern wireless systems mandate high levels of circuit integration and stringent power consumption requirements. These demands lead to various imperfections in radio-frequency ("RF") front end circuits. Thus, in many of these systems, a mismatch or imbalance exists between the quadrature-phase and in-phase signals, such that the phase difference is not 90 degrees. The I-Q mismatch corrupts the spectral purity of the received signal thereby resulting in higher bit error rates ("BER") in the communication systems. This impairment is of great significance in increasingly popular wideband communication systems.

Significant research has been devoted to measuring and compensating for I-Q mismatch in wireless communication systems. Unfortunately, this research has failed to produce a simple and efficient method of addressing I-Q mismatch. For example, some conventional methods provide adaptive methodology of correcting I-Q mismatch in quadrature modulators/demodulators using an envelope detector to down-convert the RF signal. These methods try to minimize the least squares error in obtaining the coefficients of the compensator block. The proposed methodology of these conventional systems is computationally intensive and does not necessitate the estimation of the imperfection specification. Another conventional method uses a loopback method to estimate the parametric variations in I-Q mismatch and time skew, which requires a time intensive iterative method. Yet another conventional method uses spectral analysis for I-Q mismatch cancellation and LO leakage suppression, which requires significant time and hardware overhead. Still yet another conventional method exploits the presence of an extra loopback receiver (placed for performing digital pre-distortion of HPA) to cored for I-Q mismatch and DC offset errors. The received constellations along with programmable digital-to-analog converter ("DAC") components are utilized to make corrections. These methods require full demodulators and spectrum analyzers, which make the procedures costly.

Therefore, a desire exists for simple and cost efficient systems and methods for measuring and compensating for the I-Q mismatch in communication systems. Embodiments of the present invention provide such systems and methods.

BRIEF SUMMARY OF THE INVENTION

In transmitters employing quadrature architectures, such as the transmitter shown in FIG. 1, a 90 degree phase shift is introduced between the in-phase signal and the quadrature-phase signal. Thus, ideally, the in-phase signal is represented by $I_t \cos(\omega t)$, and the quadrature phase signal is represented by $-Q_t \sin(\omega t)$, such that the two signals are 90 degrees out of phase with each other. Unfortunately, typically, the transmitter has error such that the phase shift is not 90 degrees, but may actually be less than or greater than 90 degrees. This error represents the phase mismatch between the in-phase and quadrature-phase signals. Therefore, due to the error introduced by the transmitter, the quadrature-phase signal is actually represented by $-Q_t \sin(\omega t + \phi)$, where $\phi$ is the phase mismatch. This phase-mismatch leads to variations in the gains and phases of transmitted signals, which leads to increased BERs.

If a transmitter has no phase mismatch, then the gain of a signal transmitted down the in-phase path should equal the gain of a signal transmitted down the quadrature-phase path. Because transmitters have mismatch, however, there is a difference between the gain of the in-phase and quadrature phase paths, which is known as the gain-mismatch. An exemplary embodiment of the present invention uses a power detector at the output of transmitter and a simple equation to calculate gain-mismatch. In the exemplary embodiment, a test signal is transmitted down the in-phase path of the transmitter, such that the power detector measures the in-phase transmit power of the transmitter. A test signal is then transmitted down the quadrature-phase path of the transmitter, such that the power detector measures the quadrature-phase transmit power. The gain mismatch is then calculated by taking the square root of the ratio of the in-phase transmit power and the quadrature-phase transmit power.

An exemplary embodiment of the present invention can also use a power detector at the output of the transmitter to calculate the phase mismatch of a transmitter. A test signal is transmitted down the in-phase path of the transmitter and a test signal, which has been compensated for the gain mismatch, is transmitted down the quadrature-phase path of the transmitter; thus, the power detector measures the total I-Q transmit power of the transmitter. The phase mismatch is then determined by using an equation that involves taking the arcsine of the I-Q transmit power. Therefore, by measuring the gain and phase mismatch of the transmitter, an exemplary embodiment of the present invention allows the in-phase and quadrature-phase signals to be compensated to adjust for the I-Q mismatch during transmission, thus reducing BERs and improving reliability.

While many embodiments of the present invention are discussed in the context of quadrature architectures with 90 degree shifts in phase angles, the present invention is not limited to signals that are 90 degrees out of phase. Instead, those skilled in the art will understand that the two signals can have many different phase angle differences, which are included in the scope of the present invention.

As discussed above, the present invention relates to systems and methods for measuring I-Q mismatch in transmitters and receivers. An exemplary embodiment of the present invention provides a method of measuring I-Q mismatch in a system having a transmitter. The transmitter comprises an in-phase up-converter, a quadrature-phase up-converter, and a power detector. The method of measuring I-Q mismatch comprises measuring an in-phase transmit power at the power detector caused by transmitting an in-phase output signal to the in-phase up-converter, measuring a quadrature-phase transmit power at the power detector caused by transmitting a quadrature-phase output signal to the quadrature-phase up-converter, calculating a transmitter-gain-mismatch as a function of the in-phase transmit power and the quadrature-phase transmit power, measuring an I-Q transmit power at the power detector caused by simultaneously transmitting a gain-mismatch-compensated in-phase output signal to the in-phase up-converter and a gain-mismatch-compensated quadrature-phase output signal to the quadrature-phase up-converter, and calculating a transmitter-phase-mismatch as a function of the I-Q transmit power. In an exemplary embodiment of the present invention, the in-phase output signal is an RF signal.

In another exemplary embodiment of the present invention, the quadrature-phase output signal is an RF signal.

In yet another exemplary embodiment of the present invention, the system further comprises a receiver comprising an in-phase down-converter, a quadrature-phase down-converter, an in-phase input, and a quadrature-phase input. In still another exemplary embodiment of the present invention, the method further comprises transmitting a known receiver input signal to the in-phase down-converter and the quadrature-phase down-converter, measuring an in-phase receive power at the in-phase input and a quadrature-phase receive power at the quadrature-phase input, calculating a receiver-gain-mismatch as a function of the in-phase receive power and the quadrature-phase receive power, and calculating a receiver-phase-mismatch as a function of the in-phase receive power, the quadrature-phase receive power, and the receiver-gain-mismatch. In some embodiments of the present invention, the known receiver input signal is a loop-backed output signal of the transmitter. In an exemplary embodiment of the present invention, the known receiver input signal is an RF signal.

Another exemplary embodiment of the present invention provides a method of measuring I-Q mismatch in a system having a receiver. The receiver comprises an in-phase down-converter, a quadrature-phase down-converter, an in-phase input, and a quadrature-phase input. The method of measuring I-Q mismatch comprises transmitting a known receiver input signal to the in-phase down-converter and the quadrature-phase down-converter, measuring an in-phase receive power at the in-phase input and a quadrature-phase receive power at the quadrature-phase input, calculating a receiver-gain-mismatch as a function of the in-phase receive power and the quadrature-phase receive power, and calculating a receiver-phase-mismatch as a function of the in-phase receive power, the quadrature-phase receive power, and the receiver-gain-mismatch. In another exemplary embodiments of the present invention, the known receiver input signal is a loop-backed output signal of a transmitter.

Still another exemplary embodiment of the present invention provides an I-Q mismatch measurement system comprising an in-phase up-converter, a quadrature-phase up-converter, a power amplifier, a power detector, a transmitter-gain-mismatch calculation module, and a transmitter-phase-mismatch calculation module. The power detector is configured to measure an in-phase transmit power at an output of the power amplifier when an in-phase output signal is transmitted to the in-phase up-converter. The power detector is further configured to measure a quadrature-phase transmit power at the output of the power amplifier when a quadrature-phase output signal is transmitted to the quadrature-phase up-converter. The power detector is still further configured to measure an I-Q transmit power at the output of the power amplifier when a gain-mismatch-compensated in-phase output signal and a gain-mismatch-compensated quadrature-phase output signal are simultaneously transmitted to the in-phase up-converter and the quadrature phase up-converter, respectively. The transmitter-gain-mismatch calculation module is configured to calculate a transmitter-gain-mismatch as a function of the in-phase transmit power and the quadrature-phase transmit power. The transmitter-phase-mismatch calculation module is configured to calculate a transmitter-phase-mismatch as a function of the I-Q transmit power.

In another exemplary embodiment, the in-phase output signal is an RF signal. In still another exemplary embodiment of the present invention, the quadrature-phase output signal is an RF signal. In still yet another exemplary embodiment of the present invention, the I-Q mismatch measurement system further comprises an in-phase down-converter configured to receive a known receiver input signal from the output of the power amplifier, a quadrature-phase down-converter configured to receive the known receiver input signal from the output of the power amplifier, a power measurement module configured to measure an in-phase receive power at an in-phase receiver input and configured to measure a quadrature-phase receive power at a quadrature-phase receiver input, a receiver gain mismatch calculation module configured to calculate a receiver-gain-mismatch as a function of the in-phase receive power and the quadrature-phase receive power, and a receiver phase mismatch calculation module configured to calculate a receiver-phase-mismatch as a function of the in-phase receive power, the quadrature-phase receive power, and the receiver-gain-mismatch.

Still yet another exemplary embodiment of the present invention provides an I-Q mismatch measurement system comprising an in-phase down-converter, a quadrature-phase down-converter, a power measurement module, a receiver-gain-mismatch calculation module, and a receiver-phase-mismatch calculation module. The in-phase down-converter is configured to receive a known receiver input signal. The quadrature-phase down-converter is also configured to receive the known receiver input signal. The power measurement module is configured to measure an in-phase receive power at an in-phase receiver input and configured to measure a quadrature-phase receive power at a quadrature-phase receiver input. The receiver-gain-mismatch calculation module is configured to calculate a receiver-gain-mismatch as a function of the in-phase receive power and the quadrature-phase receive power. The receiver-phase-mismatch calculation module is configured to calculate a receiver-phase-mismatch as a function of the in-phase receive power, the quadrature-phase receive power, and the receiver-gain-mismatch. In an exemplary embodiment of the present invention, the known receiver input signal is the output signal of a transmitter. In another exemplary embodiment of the present invention the known receiver input signal is an RF signal.

These and other aspects of the present invention are described in the Detailed Description below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. While one or more embodiments may be discussed as having certain advantageous features, one or more of such features may also be used with the various embodiments of the invention discussed herein. In similar fashion, while exemplary embodiments may be discussed below as system or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

DETAILED DESCRIPTION OF THE INVENTION

Figure 1:
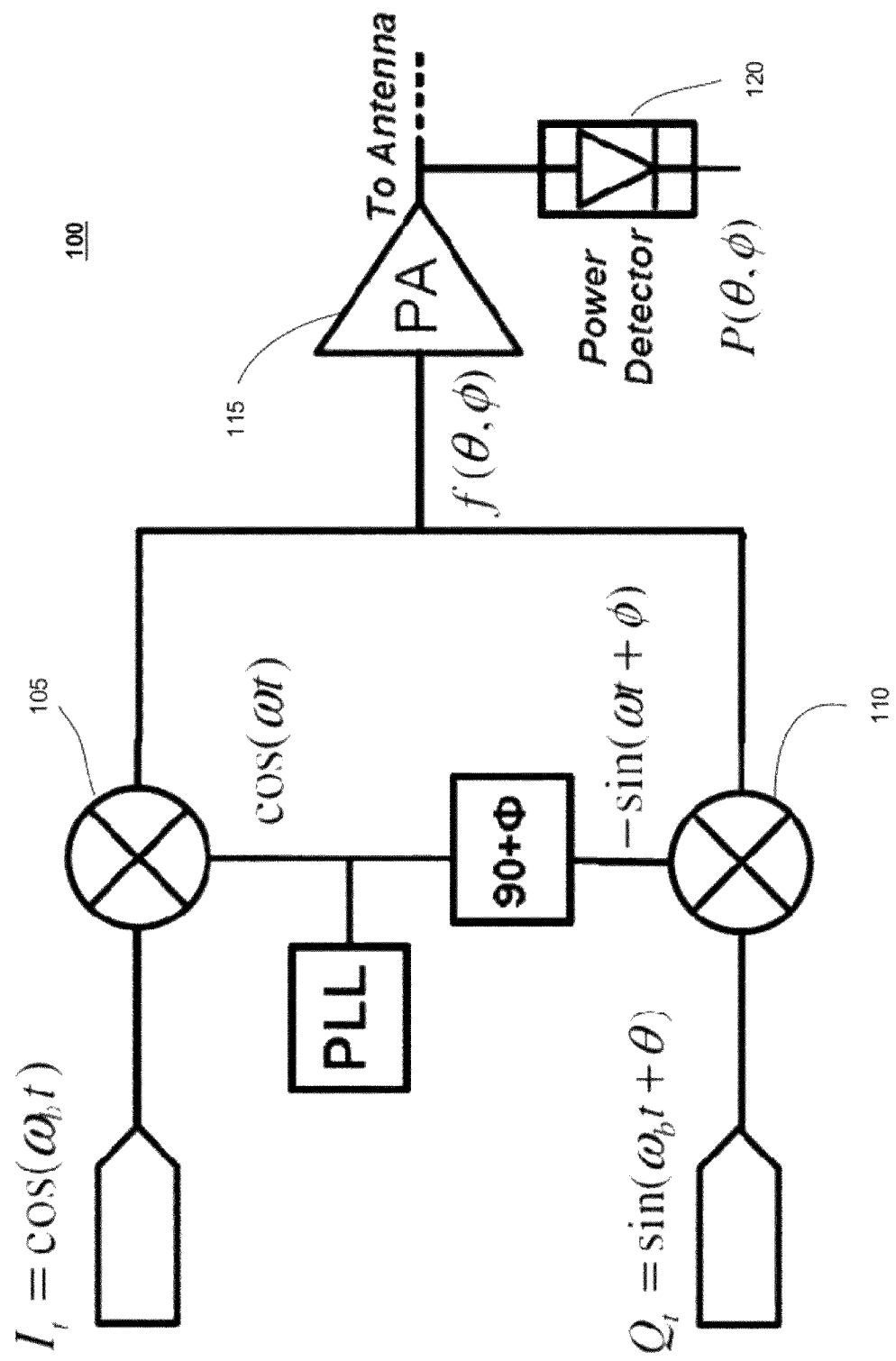
FIG. 1 provides a schematic diagram of a system having a transmitter in accordance with an exemplary embodiment of the present invention.

To facilitate an understanding of the principles and features of the present invention, various illustrative embodiments are explained below. In particular, the invention is described in the context of being systems and methods for measuring I-Q mismatch. Embodiments of the present invention may be applied to systems or methods for transmitting and receiving radio-frequency signals. Embodiments of the invention, however, are not limited to use in systems and methods for transmitting radio-frequency signals as described herein. As those of ordinary skill in the art would understand, embodiments of the invention can be used by many systems or methods for transmitting RF signals, including, but not limited to, orthogonal frequency-division multiplexing ("OFDM") systems, wireless local area network systems ("WLAN") systems, worldwide interoperability for microwave access ("WiMaX") systems, global systems for mobile communications ("GSM systems"), and the like. As described herein, RF is not limited to any particular frequency band and includes, but is not limited to, the High Frequency ("HF") band, the Very High Frequency ("VHF") band, the Ultra High Frequency ("UHF") band, Long wave ("L") band, Short wave ("S") band, the C band, the X band, the Kurz-Under ("$K_u$") band, the Kurz ("K") band, the Kurz-Above ("$K_a$") band, the V band, the W band, the mm band, and the like.

The components described hereinafter as making up various elements of the invention are intended to be illustrative and not restrictive. Many suitable components or steps that would perform the same or similar functions as the components or steps described herein are intended to be embraced within the scope of the invention. Such other components or steps not described herein can include, but are not limited to, for example, similar components or steps that are developed after development of the invention.

In I-Q transmitters, by virtue of the quadrature up-conversion, any phase mismatch in the carriers translates to the amplitude. This fact is exploited by some embodiments of the present invention to measure both gain and phase mismatch in I-Q transmitters using simple amplitude measurements through power detectors. By using amplitude measurements through power detectors, embodiments of the present invention are able to drastically reduce the complexity and hardware requirements of conventional systems and methods for measuring I-Q mismatch.

Any phase mismatch in the RF domain also holds in the baseband domain after down-conversion. Using this fact, some embodiments of the present invention measure I-Q mismatch in an RF receiver in the baseband by using a high frequency one tone RF signal as the receiver input. The amplitude and phase difference of down-converted and sampled in-phase and quadrature-phase signals can provide a measure of the gain and the phase mismatch in the receiver. This one tone signal can be generated from the transmitter itself; thus, in some embodiments of the present invention, the need for any extra hardware is reduced.

An exemplary embodiment of the present invention provides a transmitter I-Q mismatch measurement system comprising an in-phase up-converter 105, a quadrature-phase up-converter 110, a power amplifier 115, a power detector 120, a transmitter-gain-mismatch calculation module (not shown), and a transmitter-phase-mismatch calculation module (not shown). The power-detector 120 can be configured to measure an in-phase transmit power at an output of the power amplifier 115 when an in-phase output signal is transmitted to the in-phase up-converter 105. The power detector 120 can be further configured to measure a quadrature-phase transmit power at the output of the power amplifier 115 when a quadrature-phase output signal is transmitted to the quadrature-phase up-converter 110. The power detector 120 can be even further configured to measure an I-Q transmit power at the output of the power amplifier 115 when a gain-mismatch-compensated in-phase output signal and a gain-mismatch-compensated quadrature-phase output signal are simultaneously transmitted to the in-phase up-converter 105 and the quadrature phase up-converter 110, respectively. The transmitter-gain-mismatch calculation module can be configured to calculate a transmitter-gain-mismatch as a function of the in-phase transmit power and the quadrature-phase transmit power. The transmitter-phase-mismatch calculation module can be configured to calculate a transmitter-phase-mismatch as a function of the I-Q transmit power. In some embodiments of the present invention, the in-phase output signal and/or the quadrature-phase output signal can be RF signals.

In another exemplary embodiment of the present invention, the transmitter-gain-mismatch calculation module comprises instructions stored on memory and executed by a processor. In yet another exemplary embodiment of the present invention, the transmitter-phase-calculation module comprises instructions stored on memory and executed by a processor.

The exemplary transmitter 100 shown in FIG. 1 can be represented by Equation 1.

$$f(\theta,\phi) = I_t\cos(\omega t) - Q_t\sin(\omega t + \phi) \quad \text{Equation 1:}$$

Using $I_t = \cos(\omega_b t)$ and $Q_t = \cos(\omega_b t + \phi)$ in Equation 1, Equation 2 can be obtained.

$$\begin{aligned} f(\theta, \phi) &= \cos(\omega_b t)\cos(\omega t) - \sin(\omega_b t + \theta)\sin(\omega t + \phi) \quad \text{Equation 2} \\ &= \cos(\omega_b t)\cos(\omega t) - \sin(\omega_b t + \theta) \\ &\quad \{\sin(\omega t)\cos(\phi) + \cos(\omega t)\sin(\phi)\} \\ &= \cos(\omega t)[\cos(\omega_b t) - \sin(\omega_b t + \theta)\sin(\phi)] - \\ &\quad \sin(\omega t)[\sin(\omega_b t + \theta)\cos(\phi)] \end{aligned}$$

In Equation 2, the envelope has the information of the phase mismatch, $\phi$, i.e. phase to amplitude conversion takes place inherently in I-Q architectures. Because some embodiments of the present invention use a power detector 120, $\theta$ is found such that the sensitivity of the power detector 120 output to any small changes in $\phi$ is maximized. By assuming that the test signals $I_t$ and $Q_t$ have low enough amplitude such that the power amplifier 115 ("PA") is in the linear region with a gain $G_{PA}$, the envelope function at the output of an envelope detector can be represented by Equation 3.

$$\begin{aligned} E(\theta, \phi) &= \text{envelope}[G_{PA} \times f(\theta, \phi)] \quad \text{Equation 3} \\ &= G_{PA}\sqrt{\frac{[\cos(\omega_b t) - \sin(\omega_b t + \theta)\sin(\phi)]^2 +}{[\sin(\omega_b t + \theta)\cos(\phi)]^2}} \\ &= G_{PA}\sqrt{\frac{\cos^2(\omega_b t) - 2\sin(\omega_b t + \theta)}{\sin(\phi)\cos(\omega_b t) + \sin^2(\omega_b t + \theta)}} \end{aligned}$$

By differentiating $E^2(\theta, \phi)$ with respect to $\phi$, Equation 4 is obtained, which represents the sensitivity of the power detector 120.

$$\begin{aligned} S(\theta, \phi) &= \frac{d}{d\phi}E^2(\theta, \phi) \quad \text{Equation 4} \\ &= -2G_{PA}^2\sin(\omega_b t + \theta)\cos(\omega_b t)\cos(\phi) \\ &= G_{PA}\cos(\omega_b t)[2\sin(\omega t + 45 + \phi/2)\sin(45 + \phi/2)] \end{aligned}$$

The power sensitivity function, represented by Equation 4, obtains its maximum when $\sin(\omega_b t + \theta)$ and $\cos(\omega_b t)$ are equal or opposite, i.e. $\theta = 90°$ or $270°$. This means that for $I_t = Q_t$ or $I_t = -Q_t$, the sensitivity of change of output power to any changes in $\phi$ is maximized. In some embodiments of the present invention, $I_t = \cos(\omega_b t) = -Q_t$ can be used, as this maximizes the amplitude for positive $\phi$. Thus, Equation 5 can be obtained.

$$Tx\_\text{out}(\phi) = G_{PA}\cos(\omega_b t)[\cos(\omega t) - \cos(90 + \omega t + \phi)]Tx\_\text{out}(\phi) = G_{PA}\cos(\omega_b t)[2\sin(\omega t + 45 + \phi/2)\sin(45 + \phi/2)]|Tx\_\text{out}(\phi)| = 2G_{PA}\sin(45 + \phi/2) \quad \text{Equation 5:}$$

Thus, in some embodiments of the present invention, the phase mismatch can be calculated by monitoring the peak of the transmitter 100 output using Equation 5.

In some embodiments of the present invention, the proportionality constants also depend on the impedance mismatch and the gain/attenuation of other block in the transmitter 100 path. This composite ratio can be denoted by K. Hence, the transmitter 100 output can be represented by Equation 6.

$$|Tx\_\text{out}(\phi)| = M\sin(45 + \phi/2) \text{ where } M = 2G_{PA}K \quad \text{Equation 6:}$$

Another exemplary embodiment of the present invention provides a method of measuring I-Q mismatch in a system having a transmitter 100. The method comprises measuring an in-phase transmit power at the power detector 120 caused by transmitting an in-phase output signal to the in-phase up-converter 105, measuring a quadrature-phase transmit power at the power detector 120 caused by transmitting a quadrature-phase output signal to the quadrature-phase up-converter 110, calculating a transmitter-gain-mismatch as a function of the in-phase transmit power and the quadrature-phase transmit power, measuring an I-Q transmit power at the power detector 120 caused by simultaneously transmitting a gain-mismatch-compensated in-phase output signal to the in-phase up-converter 105 and a gain-mismatch-compensated quadrature-phase output signal to the quadrature-phase up-converter 110, and calculating a transmitter-phase-mismatch as a function of the I-Q transmit power.

In an exemplary embodiment of the present invention, the step of measuring an in-phase transmit power at the power detector 120 comprises (1) transmitting an in-phase output signal, represented by $I_t = A\cos(\omega_b t)$, to the in-phase up-converter 105, (2) transmitting a quadrature-phase output signal, represented by $Q_t = 0$, to the quadrature-phase up-converter 110, and (3) measuring the in-phase transmit power, $P_I$, at the power detector 120. In another exemplary embodiment of the present invention, the step of measuring a quadrature-phase transmit power at the power detector 120 comprises transmitting an in-phase output signal represented by $I_t = 0$ to the in-phase up-converter 105, transmitting a quadrature-phase output signal represented by $Q_t = A\cos(\omega_b t)$ to the quadrature-phase up-converter 110, and measuring the in-phase transmit power, $P_Q$, at the power detector 120. In yet another exemplary embodiment of the present invention, the step of calculating the transmitter-gain-mismatch employs Equation 7, which represents the transmitter-gain-mismatch.

$$G\_m = \sqrt{P_I/P_Q} \text{ and } K = \sqrt{2P_I/G_{PA}^2} \quad \text{Equation 7:}$$

In another exemplary embodiment of the present invention, the step of measuring the I-Q transmit power at the power detector 120 comprises transmitting a gain-mismatch-compensated in-phase output signal represented by $I_t = A\cos(\omega_b t)$ to the in-phase up-converter 105, transmitting a gain-mismatch compensated quadrature-phase output signal represented by $Q_t = -G\_m A\cos(\omega_b t)$ to the quadrature-phase up-converter 120, and measuring the I-Q transmit power, $|Tx\_\text{out}(\phi)|$, at the power detector 120, where Equation 6 holds true. Thus, in some embodiments of the present invention, the step of calculating the transmitter-phase-mismatch employs Equation 8, which represents the transmitter-phase-mismatch, and where M is known.

$$\phi = 2\left[\arcsin\left(\frac{|\text{Tx\_out}|}{|M|}\right) - 45\right] \quad \text{Equation 8}$$

Figure 2A:
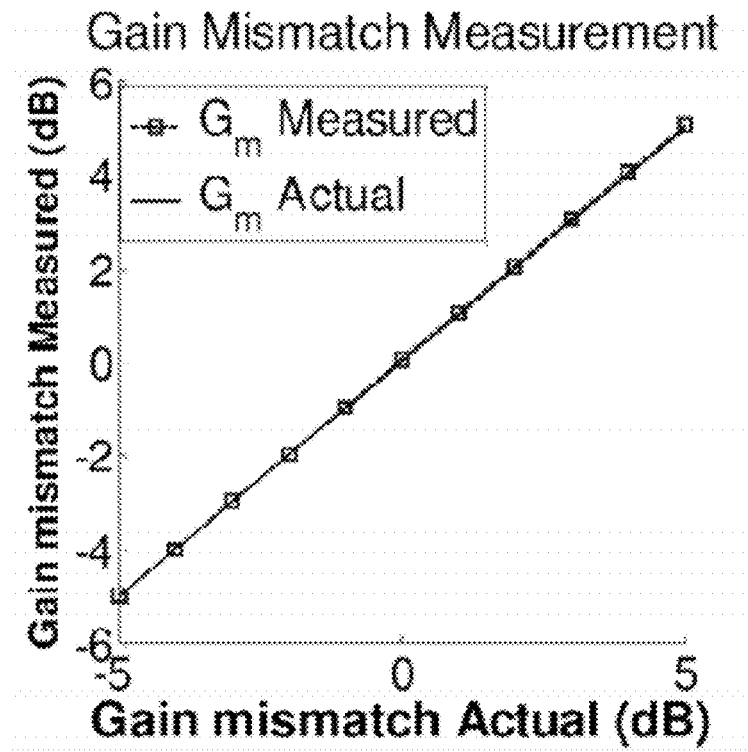
FIGS. 2A and 2B provide a graphical illustration of transmitter gain and phase mismatch, respectively, in accordance with an exemplary embodiment of the present invention.
Figure 2B:
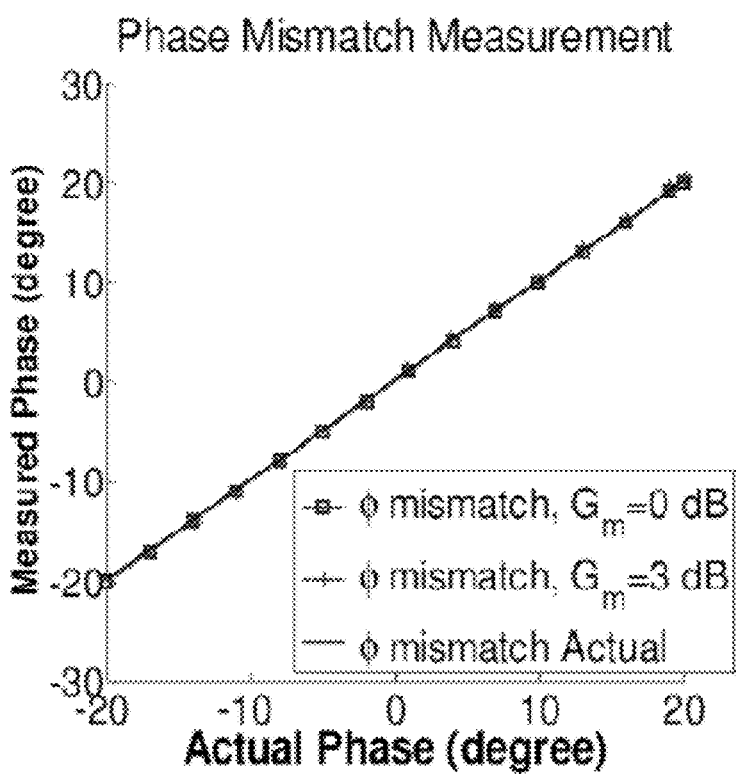

In an exemplary embodiment the method of measuring I-Q mismatch, the system comprises a transmitter 100 and a receiver 200. The receiver comprises an in-phase down-converter 205, a quadrature-phase down converter 210, an in-phase input 215, and a quadrature phase input 220. In addition to steps for measuring I-Q mismatch in the transmitter 100, the method of measuring I-Q mismatch measures I-Q mismatch in the receiver 200 and further comprises transmitting a known receiver input signal to the in-phase down-converter 205 and a quadrature-phase down-converter 210, measuring an in-phase receive power at the in-phase input 215 and a quadrature-phase receive power at the quadrature-phase input 220, calculating a receiver-gain-mismatch as a function of the in-phase receive power and the quadrature-phase receive power, and calculating a receiver-phase-mismatch as a function of the in-phase receive power, the quadrature-phase receive power, and the receiver-gain-mismatch. In some embodiments of the present invention, the known receiver input signal is a loop-backed output signal of the transmitter 100. In some embodiments of the present invention, the known receiver input signal is an RF signal FIG. 2A and FIG. 2B illustrate accurate prediction of gain and phase mismatch for a transmitter 100 by an exemplary embodiment of the present invention. Further, as shown in FIG. 2B, because I-Q inputs can be scaled according to the gain mismatch before phase measurement in some embodiments of the present invention, these embodiments achieve accuracy under different gain mismatches.

In addition to providing systems and methods for measuring I-Q mismatch in transmitters 100, the present invention provides systems and methods for measuring I-Q mismatch in receivers 200. Using a sine wave input, gain mismatch can be detected at the baseband, as any gain mismatch information is preserved in the difference in amplitude of $I_r$ and $Q_r$. Interestingly, any phase shift in the RF domain also holds after down-conversion in the baseband measure AM-PM of power amplifiers 115. These properties are exploited by various embodiments of the present invention to measure I-Q mismatch in receivers 200.

Figure 3:
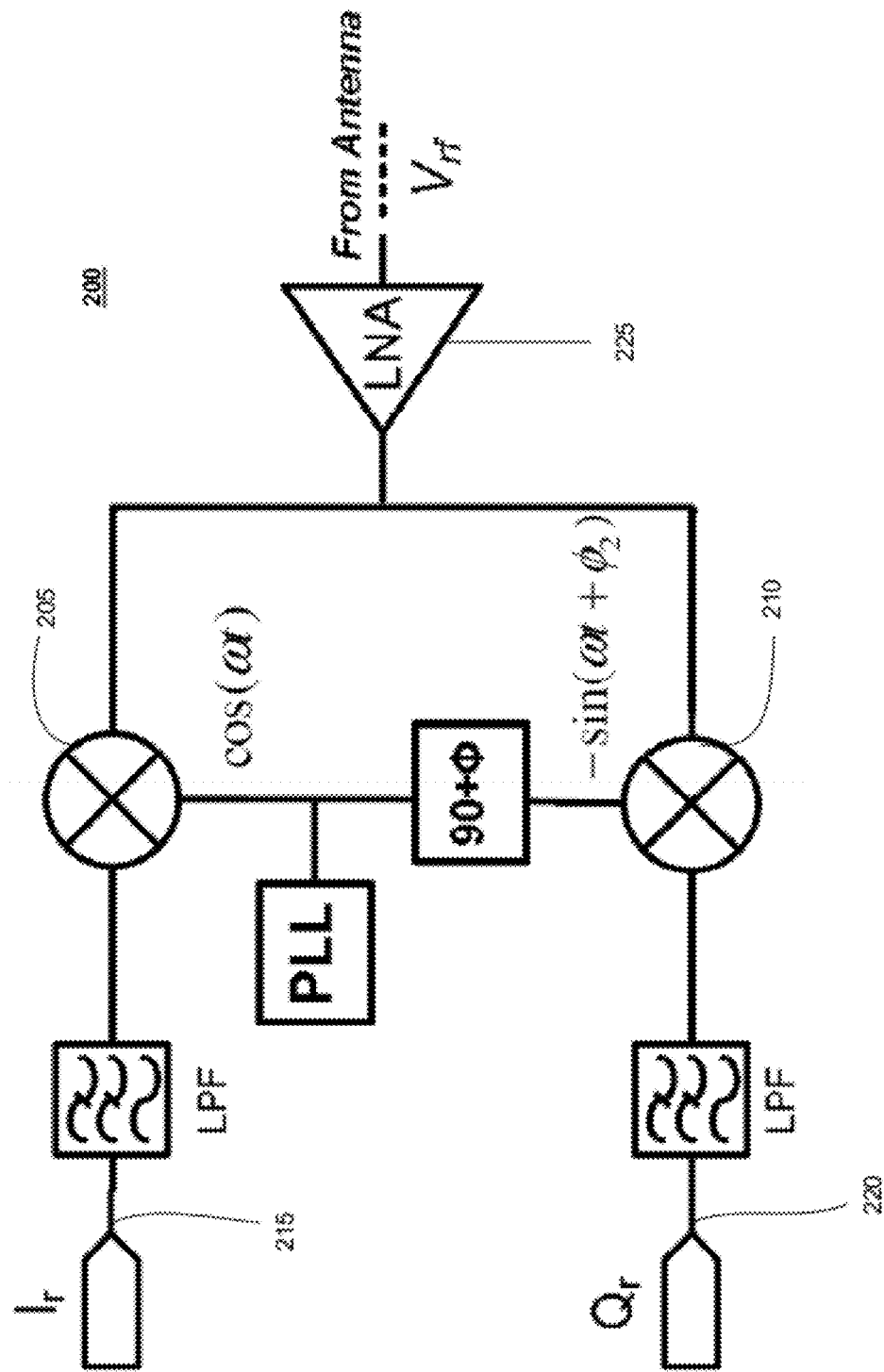
FIG. 3 provides a schematic diagram of a system having a receiver in accordance with an exemplary embodiment of the present invention.

Thus, as shown in FIG. 3, an exemplary embodiment of the present invention provides a receiver I-Q mismatch measurement system comprising an in-phase down-converter 205, a quadrature-phase down-converter 210, a power measurement module (not shown), a receiver-gain-mismatch calculation module (not shown), and a receiver-phase-mismatch calculation module (not shown). The in-phase down-converter 205 can be configured to receive a known receiver input signal. The quadrature-phase down-converter 210 can also be configured to receive the known receiver input signal. In an exemplary embodiment of the present invention, the power measurement module can be configured to measure an in-phase receive power at an in-phase receiver input 215 and configured to measure a quadrature-phase receiver power at a quadrature-phase receiver input 220. In another exemplary embodiment of the present invention, the power measurement module comprises a first sub-module configured to measure the in-phase receive power at the in-phase receiver input 215 and a second sub-module configured to measure the quadrature-phase receive power at the quadrature-phase receiver input 220. The receiver-gain-mismatch calculation module can be configured to calculate a receiver-gain-mismatch as a function of the in-phase receive power and the quadrature-phase receive power. The receiver-phase-mismatch calculation module can be configured to calculate the receiver-phase-mismatch as a function of the in-phase receive power, the quadrature-phase receive power, and the receiver-gain-mismatch. In some embodiments of the present invention, the known receiver input signal is the output signal of a transmitter 100. In some embodiments of the present invention, the known receiver input signal is an RF signal.

In an exemplary embodiment of the present invention, the power measurement module comprises instructions stored on memory and executed by a processor. In another exemplary embodiment of the present invention, the receiver-gain-mismatch calculation module comprises instructions stored on memory and executed by a processor. In yet another exemplary embodiment of the present invention, the receiver-phase-mismatch calculation module comprises instructions stored on memory and executed by a processor.

In addition to I-Q mismatch measurement systems having a receiver, some embodiments of the present invention are also directed towards methods of measuring I-Q mismatch in a system having a receiver 200. An exemplary receiver 200 is shown in FIG. 3. The receiver 200 can comprise an in-phase down-converter 205, a quadrature-phase down-converter 210, and in-phase input 215, and a quadrature phase input 220. An exemplary embodiment of the present invention provides a method of measuring I-Q mismatch in a receiver 200 comprising transmitting a known receiver input signal to the in-phase down-converter 205 and the quadrature-phase down-converter 210, measuring an in-phase receive power at the in-phase input 215 and a quadrature-phase receive power at the quadrature-phase input 220, calculating the receiver-gain-mismatch as a function of the in-phase receive power and the quadrature-phase receive power, and calculating the receiver-phase-mismatch as a function of the in-phase receive power, the quadrature-phase receive power, and the receiver-gain-mismatch.

In some embodiments, the receiver input signal can be represented by $V_{rf}$ in Equation 9.

$$V_{rf} = A_{rf}\cos(\omega_{rf}t) \text{ where } \omega_{rf} = \omega + \omega_b \quad \text{Equation 9:}$$

The receiver input signal can be down-converted by mixers in the receiver 200 and received by Analog-to-Digital Converters ("ADCs") after filtering. The sampled signal in the I and Q paths can be represented as $I_r = \text{LPF}[G_{Rx\_I}V_{rf}\cos(\omega t)]$ and $Q_r = \text{LPF}[-G_{Rx\_Q}V_{rf}\cos(\omega t + \phi_2)]$, where $G_{Rx\_I}$ is the gain of a low noise amplifier ("LNA") 225 of the receiver 200 and I path and $G_{Rx\_Q}$ is the gain of the LNA 225 and Q path. These signals can be expressed as shown in Equations 10 and 11.

$$I_r = \text{LPF}[G_{Rx\_I}A_{rf}\cos(\omega t + \omega_b t)\cos(\omega t)] \quad \text{Equation 10}$$
$$= \text{LPF}\left[\frac{G_{Rx\_I}A_{rf}}{2}[\cos(2\omega t + \omega_b t) + \cos(\omega_b t)]\right]$$
$$= \frac{G_{RX\_I}A_{rf}}{2}\cos(\omega_b t)$$

$$Q_r = \text{LPF}\left[-\frac{G_{Rx\_I}A_{rf}}{2}\left[\begin{array}{c}\sin(2\omega t + \omega_b t + \phi_2) - \\ \sin(\omega_b t - \phi_2)\end{array}\right]\right] \quad \text{Equation 11}$$
$$= \frac{G_{Rx\_I}A_{rf}}{2}\sin(\omega_b t - \phi_2)$$

The receiver-gain-mismatch, $Q_{\_m}$ is represented by Equation 12. Therefore, in some embodiments of the present invention, the step of calculating the receiver-gain-mismatch employs Equation 12.

$$G_{\_m} = |I_r|/|Q_r| \quad \text{Equation 12:}$$

Considering the difference between the amplitude equalized $I_r$ and $Q_r$, the phase difference gets transferred to the amplitude as shown in Equation 13.

$$IQ_{out}=I_r-G_mQ_r=LPR\{|I_r|\cos(\omega_{rf}t)[\cos(\omega t)+\sin(\omega t)+\phi_2)]\}, \text{ or } |IQ_{out}|=2|I_r|\sin 45+\phi_2/2 \quad \text{Equation 13:}$$

Thus, the receiver-phase-mismatch, $\phi_2$, is represented by Equation 14. Therefore, in some embodiments of the present invention, the step of calculating a receiver-phase-mismatch employs Equation 14.

$$\phi_2 = 2\left[\arcsin\left(\frac{|IQ_{out}|}{2|I_r|}\right) - 45\right] \quad \text{Equation 14}$$

In some embodiments of the present invention, the receiver input signal is generated through loopback from a transmitter 100 by applying $I_t=A\cos(\omega_b t)$ and $Q_t=-G_m A\cos(\omega_b t)$ so that the transmitter 100 has a single sideband output of a sine wave with frequency $\omega_{rf}=\omega+\omega_b$.

Figure 4A:
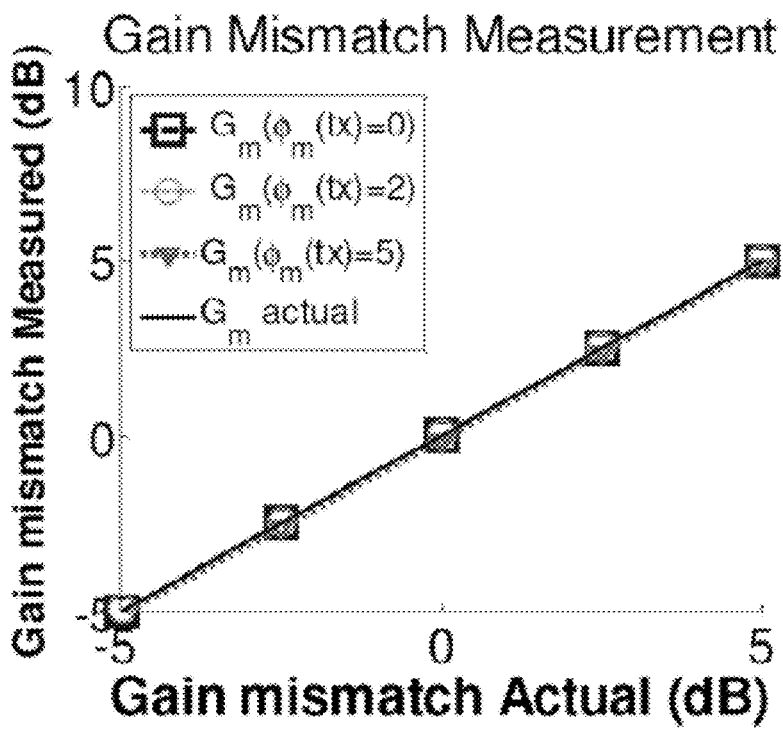
FIGS. 4A and 4B provide a graphical illustration of receiver gain and phase mismatch, respectively, in accordance with an exemplary embodiment of the present invention.
Figure 4B:
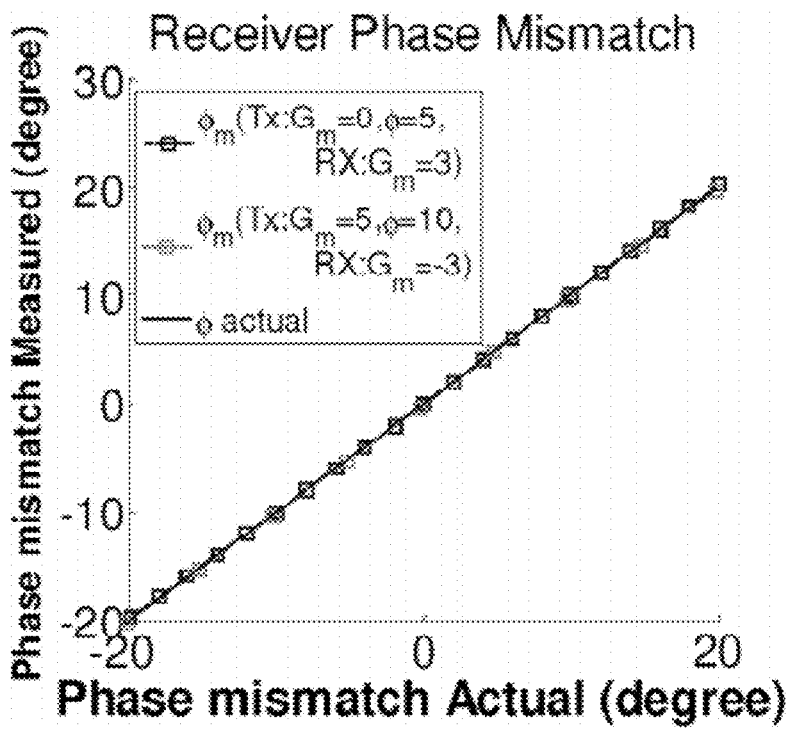
Figure 6:
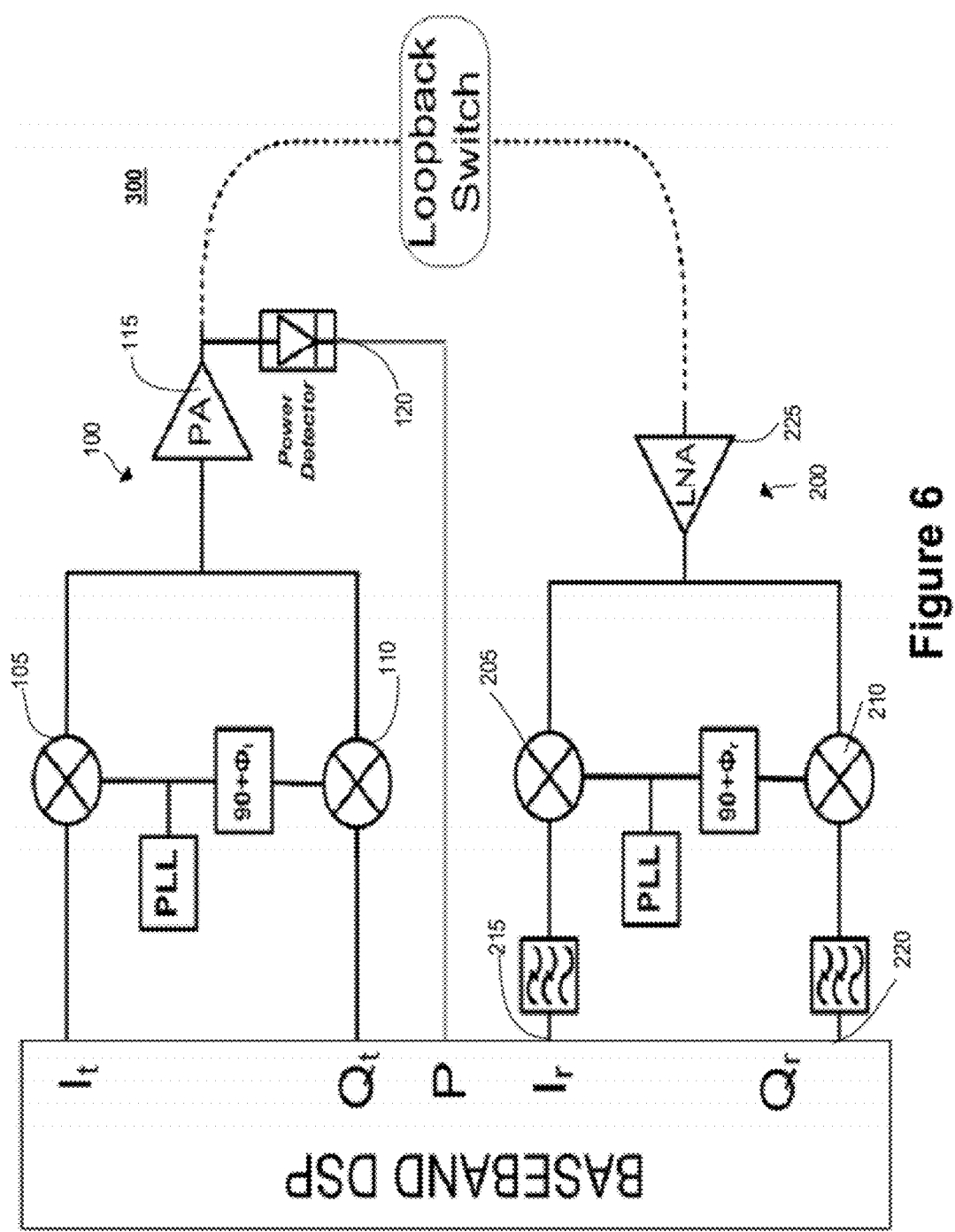
FIG. 6 provides a schematic diagram of a system having a transmitter and receiver in accordance with an exemplary embodiment of the present invention.

In some embodiments of the present invention, the I-Q mismatch can be calculated for a transceiver 300 comprising a transmitter 100 and a receiver 200, as shown in FIG. 6. In an exemplary embodiment, the I-Q mismatch of the transmitter 100 is measured and compensated for before the receiver I-Q mismatch is measured and compensated. In another exemplary embodiment of the present invention, the I-Q mismatch of the receiver 200 is measured and compensated for before the transmitter I-Q mismatch is measured and compensated. As shown in FIG. 4A and FIG. 4B, for an accurately compensated transmitter 100, the gain mismatch can be measured very accurately with an exemplary embodiment of the present invention. FIG. 4B also illustrates accurate measurement for receiver-phase-mismatch for two different compensated transmitters 100 by an exemplary embodiment of the present invention.

Figure 5A:
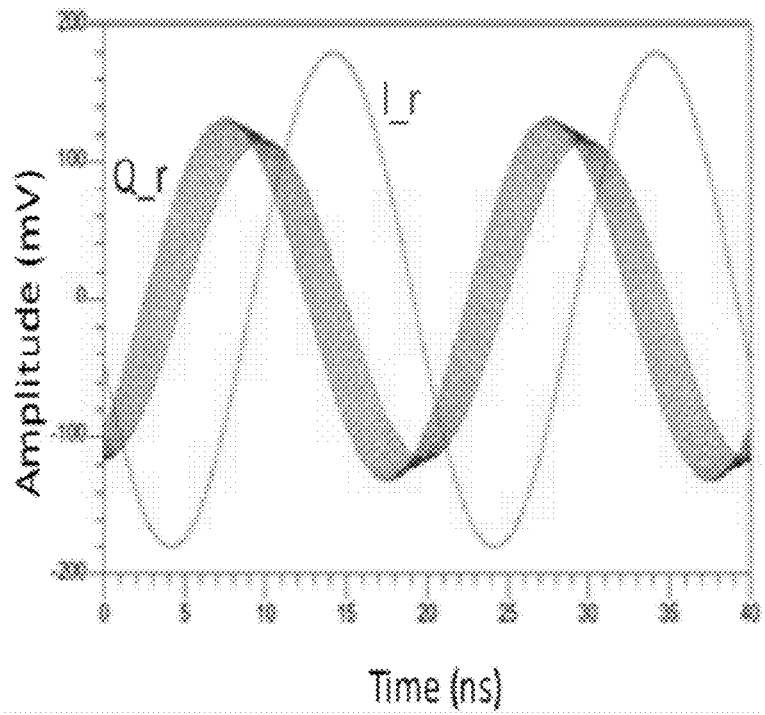
FIG. 5A provides a graphical comparison of a received baseband signal from an uncompensated transmitter in accordance with an exemplary embodiment of the present invention.
Figure 5B:
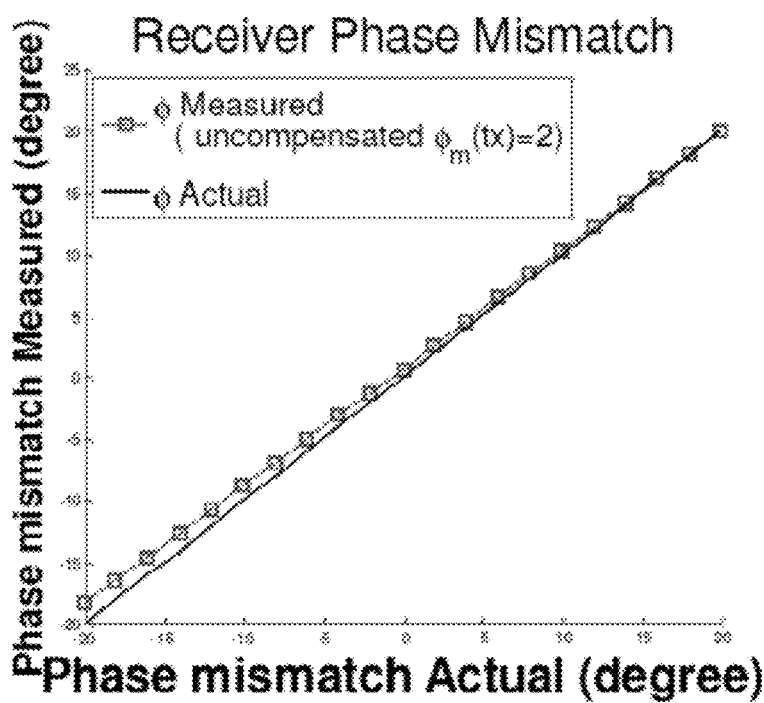
FIG. 5B provides a graphical illustration of receiver phase mismatch resulting from receiving a signal from an uncompensated transmitter in accordance with an exemplary embodiment of the present invention.

FIG. 5A provides a plot of two cycles of received baseband signals, in accordance with an exemplary embodiment of the present invention. The receiver-gain-mismatch is evident from the difference in amplitude of the two signals. The receiver-phase-mismatch was assumed to be in the Q path for this simulation. With a perfectly compensated transmitter 100, the amplitude of $Q_r$ is the same over all $\phi$, but with an uncompensated transmitter-phase-mismatch, this amplitude increases as shown in FIG. 5A, which causes the receiver measurement errors.

FIG. 6 provides a block diagram of an I-Q transceiver system. Using baseband inputs to the transmitter 100, $I_t$ and $Q_t$, baseband outputs from the receiver 200, $I_r$ and $Q_r$, and built-in power detector output, P, I-Q gain and phase mismatch of both the transmitter 100 and receiver 200 can be found using exemplary embodiments of the present invention.

Figure 7:
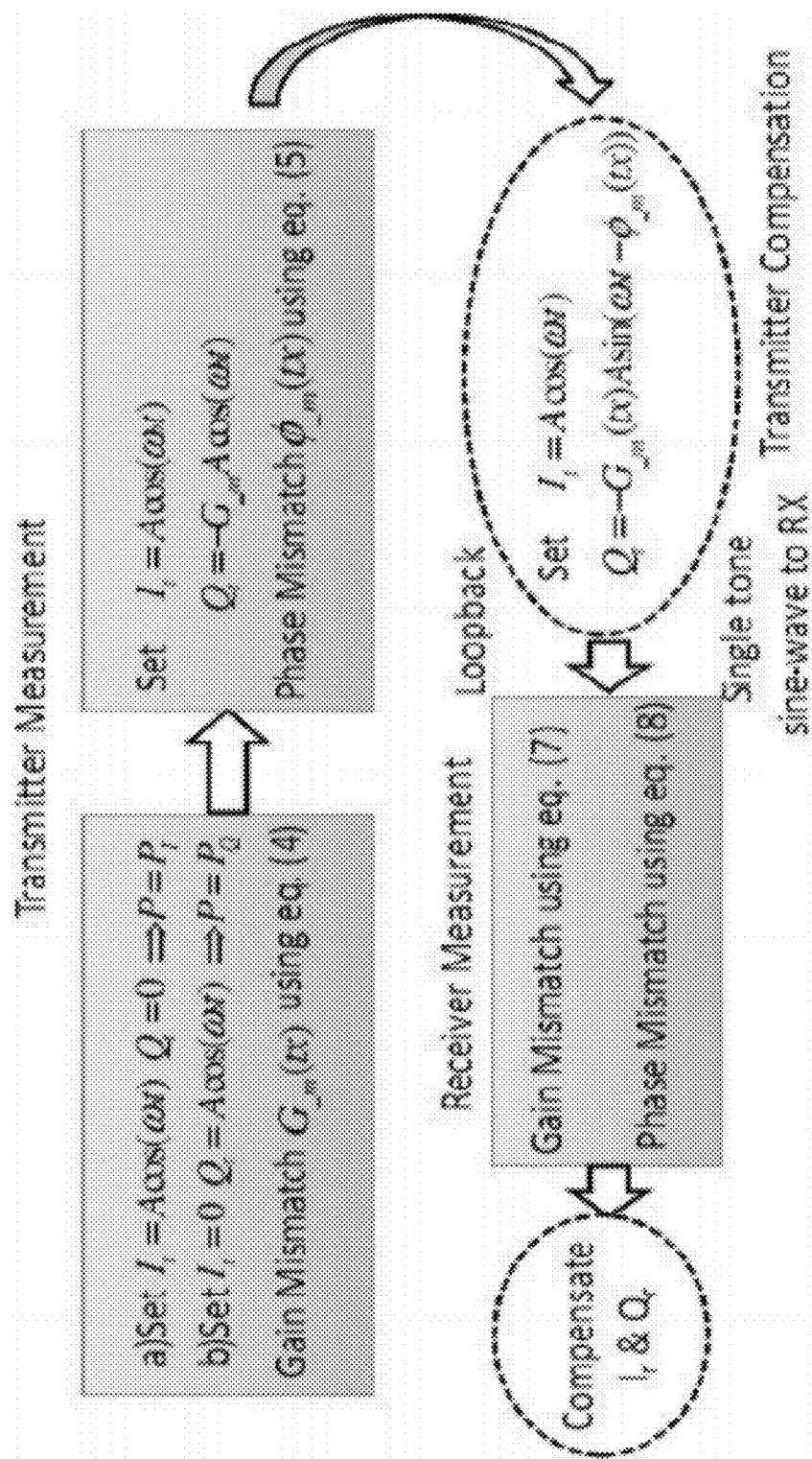
FIG. 7 provides a block diagram of a method of measuring and compensating for I-Q mismatch in a system having a transmitter and a receiver in accordance with an exemplary embodiment of the present invention.
Figure 8A:
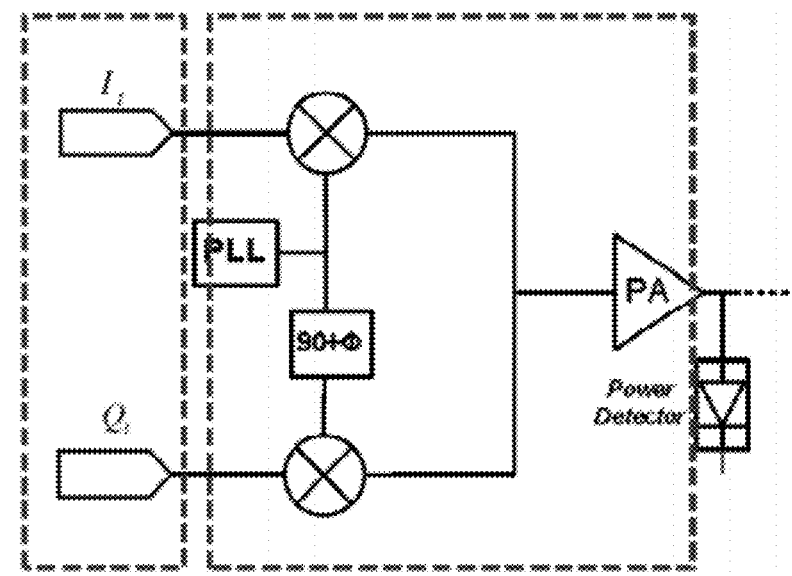
FIGS. 8A and 8B provide the hardware set-up for experimental tests of an exemplary embodiment of the present invention.
Figure 8B:
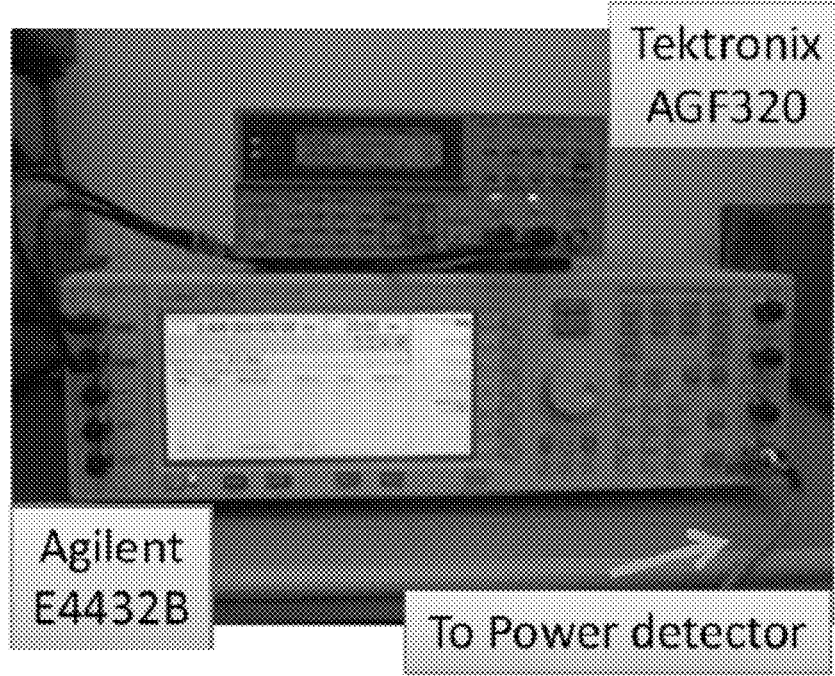

FIG. 7 provides measurement and compensation methodology for a transceiver 300 in accordance with an exemplary embodiment of the present invention. The exemplary method comprises the steps of calculating the transmitter-gain-mismatch by employing Equation 7, calculating the transmitter-phase-mismatch by employing Equation 8, compensating the transmitter for the transmitter-gain-mismatch and transmitter-phase-mismatch, calculating the receiver-gain-mismatch by employing Equation 12, calculating the receiver-phase-mismatch by employing Equation 14, and compensating the receiver for the receiver-gain-mismatch and receiver-phase-mismatch FIG. 8 provides the experimental setup for hardware validation of an exemplary embodiment of the present invention.

Figure 9A:
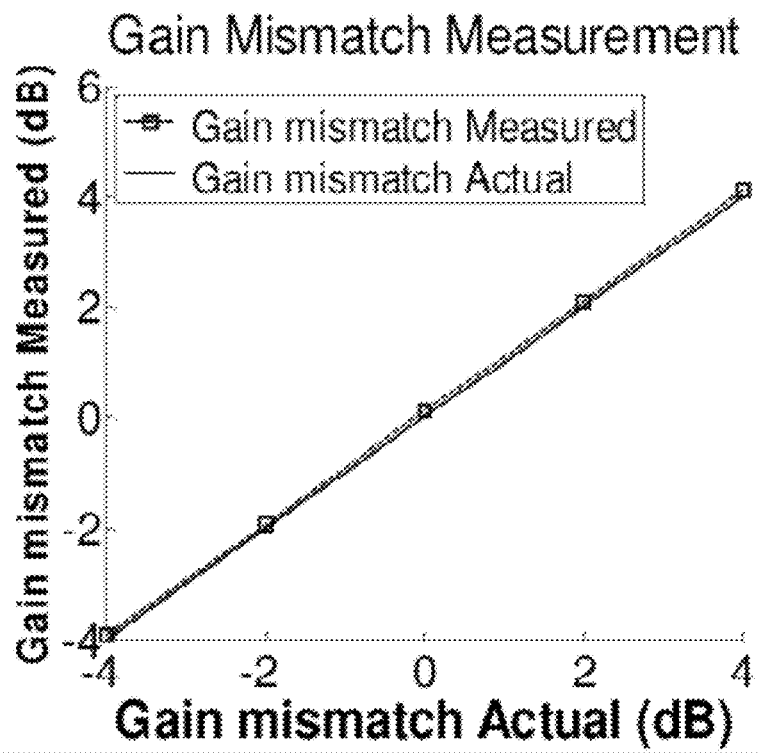
FIGS. 9A and 9B provide a graphical illustration of gain and phase mismatch measurement, respectively, in accordance with an exemplary embodiment of the present invention.
Figure 9B:
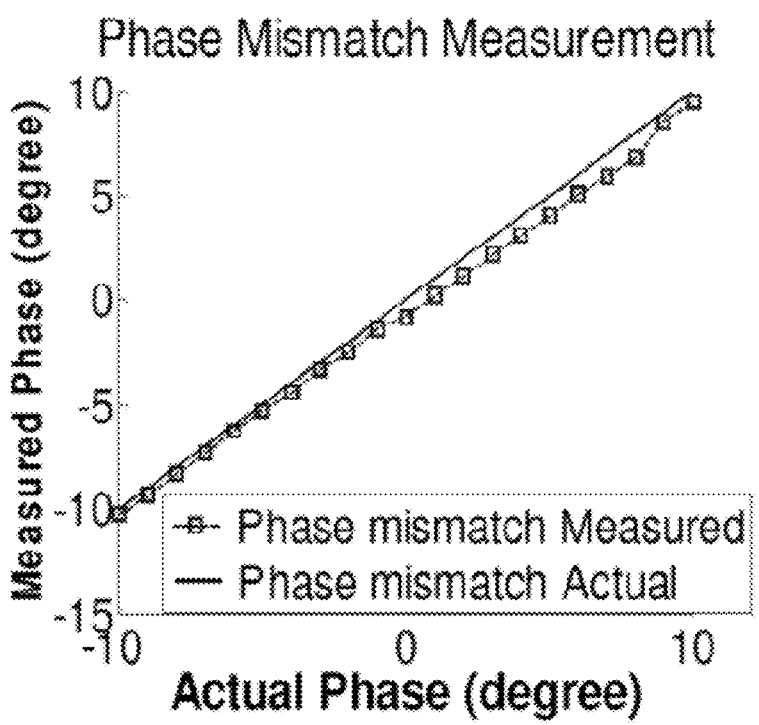

A Tektronix function generator AGF320 was used to generate $I_t$ and $Q_t$. An Agilent 4432B RF signal generator with a built-in quadrature up-converter with controllable I-Q gain and phase mismatch was used to implement an I-Q modulator. $I_t$ and $Q_t$ were generated as 1 MHz sine waves with amplitude of 0.3V and phase of 90° and 270°, respectively. The I-Q modulator used an RF carrier of 2.4 GHz. The output of the modulator was fed to a power detector. Transmitter-gain-mismatch and transmitter-phase-mismatch were calculated in accordance with an exemplary embodiment of the present invention. Both gain and phase mismatch obtained from the experiment are plotted with actual values in FIGS. 9A and 9B, respectively. Maximum errors in the gain and phase measurements were within 0.5% and 4.5%, respectively.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A method of measuring I-Q mismatch in a system having a transmitter, the transmitter comprising an in-phase up-converter, a quadrature-phase up-converter, and a power detector, the method comprising:

measuring an in-phase transmit power at the power detector caused by transmitting an in-phase output signal to the in-phase up-converter;

measuring a quadrature-phase transmit power at the power detector caused by transmitting a quadrature-phase output signal to the quadrature-phase up-converter;

calculating a transmitter-gain-mismatch as a function of the in-phase transmit power and the quadrature-phase transmit power;

measuring an I-Q transmit power at the power detector caused by simultaneously transmitting a gain-mismatch-compensated in-phase output signal to the in-phase up-converter and a gain-mismatch-compensated quadrature-phase output signal to the quadrature-phase up-converter; and calculating a transmitter-phase-mismatch as a function of the I-Q transmit power, wherein the step of calculating the transmitter-gain-mismatch comprises solving the equation $G_{13\_m}=\sqrt{P_I/P_Q}$, where $G_{13\_m}$ is the transmitter-gain-mismatch, $P_I$ is the in-phase transmit power, and $P_Q$ is the quadrature-phase transmit power.

2. The method of measuring I-Q mismatch in a system of claim 1, wherein the in-phase output signal is a radio-frequency signal.

3. The method of measuring I-Q mismatch in a system of claim 1, wherein the quadrature-phase output signal is a radio-frequency signal.

4. The method of measuring I-Q mismatch in a system of claim 1, wherein the step of calculating the transmitter-phase-mismatch comprises solving the equation $$\phi = 2\left[\arcsin\left(\frac{|Tx\_out|}{|M|}\right) - 45\right],$$

where $\phi$ is the transmitter-phase-mismatch and $Tx_{13}$ out is the I-Q transmit power.

5. The method of measuring I-Q mismatch in a system of claim 1, the system further comprising a receiver comprising an in-phase down-converter, a quadrature-phase down-converter, an in-phase input, and a quadrature-phase input, the method further comprising:
   transmitting a known receiver input signal to the in-phase down-converter and the quadrature-phase down-converter;
   measuring an in-phase receive power at the in-phase input and a quadrature-phase receive power at the quadrature-phase input;
   calculating a receiver-gain-mismatch as a function of the in-phase receive power and the quadrature-phase receive power; and
   calculating a receiver-phase-mismatch as a function of the in-phase receive power, the quadrature-phase receive power, and the receiver-gain-mismatch.

6. The method of measuring I-Q mismatch in a system of claim 5, wherein the known receiver input signal is a loop-backed output signal of the transmitter.

7. The method of measuring I-Q mismatch in a system of claim 5, wherein the known receiver input signal is a radio-frequency signal.

8. A method of measuring I-Q mismatch in a system having a transmitter, the transmitter comprising an in-phase up-converter, a quadrature-phase up-converter, and a power detector, the method comprising:
   measuring an in-phase transmit power at the power detector caused by transmitting an in-phase output signal to the in-phase up-converter;
   measuring a quadrature-phase transmit power at the power detector caused by transmitting a quadrature-phase output signal to the quadrature-phase up-converter;
   calculating a transmitter-gain-mismatch as a function of the in-phase transmit power and the quadrature-phase transmit power;
   measuring an I-Q transmit power at the power detector caused by simultaneously transmitting a gain-mismatch-compensated in-phase output signal to the in-phase up-converter and a gain-mismatch-compensated quadrature-phase output signal to the quadrature-phase up-converter; and
   calculating a transmitter-phase-mismatch as a function of the I-Q transmit power,
   wherein the step of calculating the transmitter-phase-mismatch comprises solving the equation $$\phi = 2\left[\arcsin\left(\frac{|Tx\_out|}{|M|}\right) - 45\right],$$

equation where $\phi$ is the transmitter-phase-mismatch and $Tx_{13}$ out is the I-Q transmit power.

9. The method of measuring I-Q mismatch in a system of claim 8, wherein the in-phase output signal is a radio-frequency signal.

10. The method of measuring I-Q mismatch in a system of claim 8, wherein the quadrature-phase output signal is a radio-frequency signal.

11. The method of measuring I-Q mismatch in a system of claim 8, wherein the step of calculating the transmitter-gain-mismatch comprises solving the equation $G_{13\_m} = \sqrt{P_I/P_Q}$, where $G_{\_m}$ is the transmitter-gain-mismatch, $P_I$ is the in-phase transmit power, and $P_Q$ is the quadrature-phase transmit power.

12. The method of measuring I-Q mismatch in a system of claim 8, the system further comprising a receiver comprising an in-phase down-converter, a quadrature-phase down-converter, an in-phase input, and a quadrature-phase input, the method further comprising:
   transmitting a known receiver input signal to the in-phase down-converter and the quadrature-phase down-converter;
   measuring an in-phase receive power at the in-phase input and a quadrature-phase receive power at the quadrature-phase input;
   calculating a receiver-gain-mismatch as a function of the in-phase receive power and the quadrature-phase receive power; and
   calculating a receiver-phase-mismatch as a function of the in-phase receive power, the quadrature-phase receive power, and the receiver-gain-mismatch.

13. The method of measuring I-Q mismatch in a system of claim 12, wherein the known receiver input signal is a loop-backed output signal of the transmitter.

14. The method of measuring I-Q mismatch in a system of claim 12, wherein the known receiver input signal is a radio-frequency signal.

* * * * *